United States Patent

[11] 3,587,200

[72] Inventors Roger W. Stone
Highland Park;
Donald R. Rorer, Lake Bluff, both of Ill.
[21] Appl. No. 826,604
[22] Filed May 21, 1969
[45] Patented June 28, 1971
[73] Assignee Stone Container Corporation,
Chicago, Ill.

[54] CONTINUOUS SKIN-PACKAGING MACHINE AND METHOD
31 Claims, 17 Drawing Figs.

[52] U.S. Cl. ................................................ 53/22,
53/112
[51] Int. Cl. ............................................... B65b 31/00
[50] Field of Search ........................................... 53/22, 112,
(Skin Pack Dig.)

[56] References Cited
UNITED STATES PATENTS
3,071,905 1/1963 Morse ........................... 53/22
3,204,384 9/1965 Dallas ............................ 53/22

Primary Examiner—Travis S. McGehee
Attorney—Silverman & Cass

ABSTRACT: A continuous skin-packaging machine having a linearly movable conveyor for transporting a continuous web or series of discrete base pads or substrates with articles thereon to a vacuum-forming station. A vacuum-forming station is arranged in line with said conveyor including an angularly displaceable array of platens for receiving the web or a base pad with articles transferred from the conveyor and moving in the same direction of movement as the conveyor and applying a vacuum draw to the underside of the web or base pad concurrently. A heater assembly and a thermoplastic film-transporting mechanism associated therewith are spaced above the conveyor for delivering heated film to the vicinity of transfer of the web or a base pad to the vacuum-forming station so that the film can be laminated to the web or base pad encasing said articles thereon as the web or base pad is moved by the platens. Said skin-packaging operation is performed continuously with continuous feeding of web or base pad with articles and heated film to said vacuum-forming station. The machine also can have a package-trimming station for receiving the completed packages discharged from the vacuum-forming station.

Also, there is evolved a novel method of making skin packages continuously in accordance with the steps performed sequentially by the continuous skin-packaging machine aforesaid.

CONTINUOUS SKIN-PACKAGING MACHINE AND METHOD

FIELD OF THE INVENTION

This invention relates generally to apparatus for making skin packages wherein a carded article is encased in a thin layer or sheet of thermoplastic material adhered to the card or substrate and more particularly, to a novel skin-packaging machine for continuously making such skin packages. The invention further is concerned with a novel method of making skin packages continuously by a sequence of steps as advantageously performed by the aforesaid machine.

DESCRIPTION OF THE PRIOR ART

This invention is directed to providing a continuous skin-packaging machine as distinguished from a manually or cyclically operated machine. An example of the latter type of skin-packaging machine is represented by the skin-packaging apparatus disclosed in my U.S. Pat. No. 3,377,770, issued Apr. 16, 1968. In the operation of this machine, it is necessary periodically to load the platen assembly with a carded article and to charge the drape frame with thermoplastic film. This periodic loading and charging of particular stations and operating parts of the machine for each cycle of operation serve to characterize the sequence of operation of the machine as intermittent or interrupted, although certain automatic loading and charging equipment can be provided which would assist in speeding up the operation of the machine for mass production purposes.

On the other hand, a continuous packaging machine is represented by the apparatus described in U.S. Pat. No. 3,071,905 issued Jan. 8, 1963 to Hugh B. Morse and U.S. Pat. No. 3,204,384 issued Sept. 7, 1965 to Donald E. Dallas, Jr. The so-called continuous packaging machine represents an attempt to eliminate the necessity for periodic loading and charging of the skin-packaging machine, as hereinabove described. The herein invention is concerned with providing a continuous skin-packaging machine as presented generally by said Morse and Dallas patents.

Insofar as I am aware, the continuous skin-packaging machines of said Morse and Dallas patents have not been commercially available and have not achieved commercial acceptance. Such prior machines have been incapable of forming skin packages, trimming and slitting the packages and ejecting them from the machine in a continuous manufacturing operation. These prior machines have not been capable of handling a sufficiently wide variety of base pad or substrate material without major modification and downtime. These prior machines encountered prohibitive difficulties in obtaining proper feeding and alignment of the thermoplastic sheet or film and base pad material required to be brought into proper registry, one with the other, for proper continuous operation of the machine. Further, such prior machines could not handle a sufficient variety of package sizes and configurations and could not accommodate the different thermoplastic films and substrate materials which have become available today. Since machines, such as disclosed by Morse, employed a vacuum draw through the conveyor material, it was necessary to be critically concerned with the nature and porosity of the conveyor material in order to achieve proper vacuum draw. Also, the type and variety of substrate was severely limited.

Still another problem encountered with prior machines were their unduly large size which necessitated occupation of expensive floor space and manufacturing facilities and the resulting high cost per package unit by reason of the limitations in the speed and versatility in operation of such prior machines.

While the above discussion has been directed to the primary disadvantages of prior continuous skin-packaging machines eliminated by my invention, it is contemplated that the continuous skin-packaging machine embodying the invention will solve many other problems inherent in the prior art as more fully explained in the following objects.

SUMMARY OF THE INVENTION

It is a primary object of this invention to provide a continuous skin-packaging machine which will successfully eliminate all of the problems and disadvantages of the prior art machines heretofore discussed. In attaining this primary objective, there is provided a continuous skin-packaging machine having a novel vacuum-producing mechanism, a novel chain-driven thermoplastic film-transporting mechanism, including film guide means, web or substrate guide means in registry with the film guide means for assuring proper alignment of the film and web or substrate at all times during continuous operation of the machine, and a novel heating assembly cooperating with said vacuum-producing means, film-transporting mechanism and web or substrate and film guide means for achieving such continuous skin-packaging manufacture. Further, there can be utilized package severing or trimming means cooperating with all of said prior-mentioned means for achieving proper ejection from the machine of completed packages. Also, there is a web or substrate conveyor synchronized in its movement with the film-transporting means and said vacuum-producing means in the continuous operation of the skin-packaging machine embodying the invention.

Another important object of the invention is to provide a continuous skin-packaging machine utilizing an angularly displaceable vacuum-producing means synchronized in its movement with the movement of the film-transporting means and substrate transporting or conveyor means for achieving continuous formation of skin packages, said vacuum-producing means including an array of platens which can function to transfer completed packages to a package-trimming station on said machine.

Another object of the invention is to provide a modified form of rotary platen system which is especially suitable for drawing relatively stronger vacuums at higher speeds of producing packages than has been achieved heretofore.

Another object of the invention is to provide a method of making skin packages continuously by means of a novel sequence of procedures involving the handling and delivery of package materials to a vacuum-forming station which also performs a package material transporting function during continuous production of the skin packages at said station.

Other objects of the invention will occur to those skilled in the art as a description thereof ensues in connection with the preferred embodiment of the invention described in the specification and illustrated in the accompanying drawings.

DESCRIPTION OF THE PREFERRED EMBODIMENTS

Referring to the drawings, the reference character 20 designates generally the continuous skin-packaging machine embodying the invention. Said machine has a main support frame 22 formed of interconnected structural member supported on legs 23. Intermediate opposite ends 24 and 25 of the support frame is an upstanding cabinet or housing 26 in which the package-forming station of the machine is located. In the normal operation of machine 20, a carded article or a plurality of carded articles will be loaded on the machine at the end 24 for movement along a conveyor 27 from left to right as viewed in FIGS. 1 and 2, transported through the cabinet 26 where the thermoplastic film or sheet will be vacuum formed and laminated to the card or substrate to produce skin packages which thereafter are ejected from the cabinet for further trimming thereof, is desired. The skin packages then are removed from the machine at the end 25. Thus, for convenience, the end 24 will be considered the entrance or loading end of the machine and the end 25 will be considered the exit or discharge end of the machine, where a package-trimming station is provided.

Likewise, the cabinet 26 has an opening 28' in side 28 facing toward the end 24 through which the carded articles are introduced and an opposite similarly open side 29 from which the skin packages produced in the cabinet are discharged. The open side 28 will be considered the entrance end and the open side 29 will be considered the exit end of the cabinet. At the front side of the cabinet are a pair of doors 30 each having a viewing window 31 into the work chamber of the cabinet. Below the doors 30 is a compact electrical instrument console 32 having a control panel 33 on which control switches, indicator dials, regulatory indicators and the like means for monitoring the automatic and continuous operation of the machine 20, as well as for starting and stopping the same, are located. For purposes of simplicity and clarity of disclosure, these component parts of the control panel have not been illustrated. The console 32 holds the electrical circuit components, preferably solid-state electrical components suitably mounted on circuit boards for convenient and easy servicing of the machine.

Figure 1:
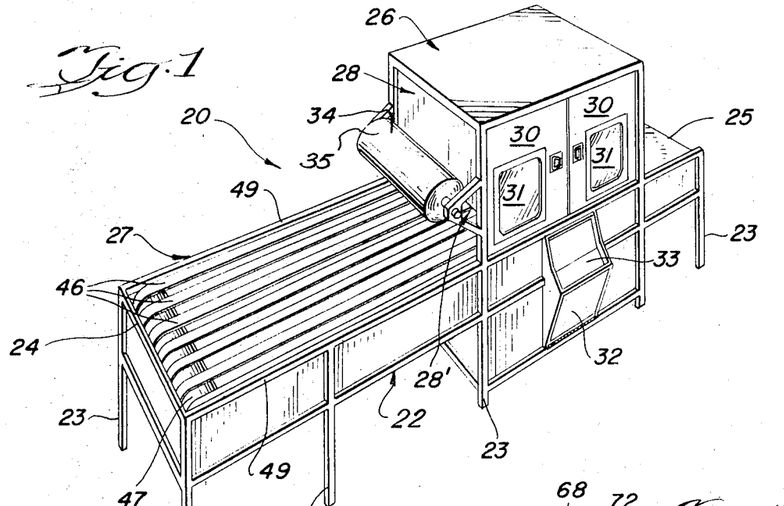
FIG. 1 is a perspective view of the continuous skin-packaging machine embodying the invention and shown in a quiescent state.
Figures 2, 2A:
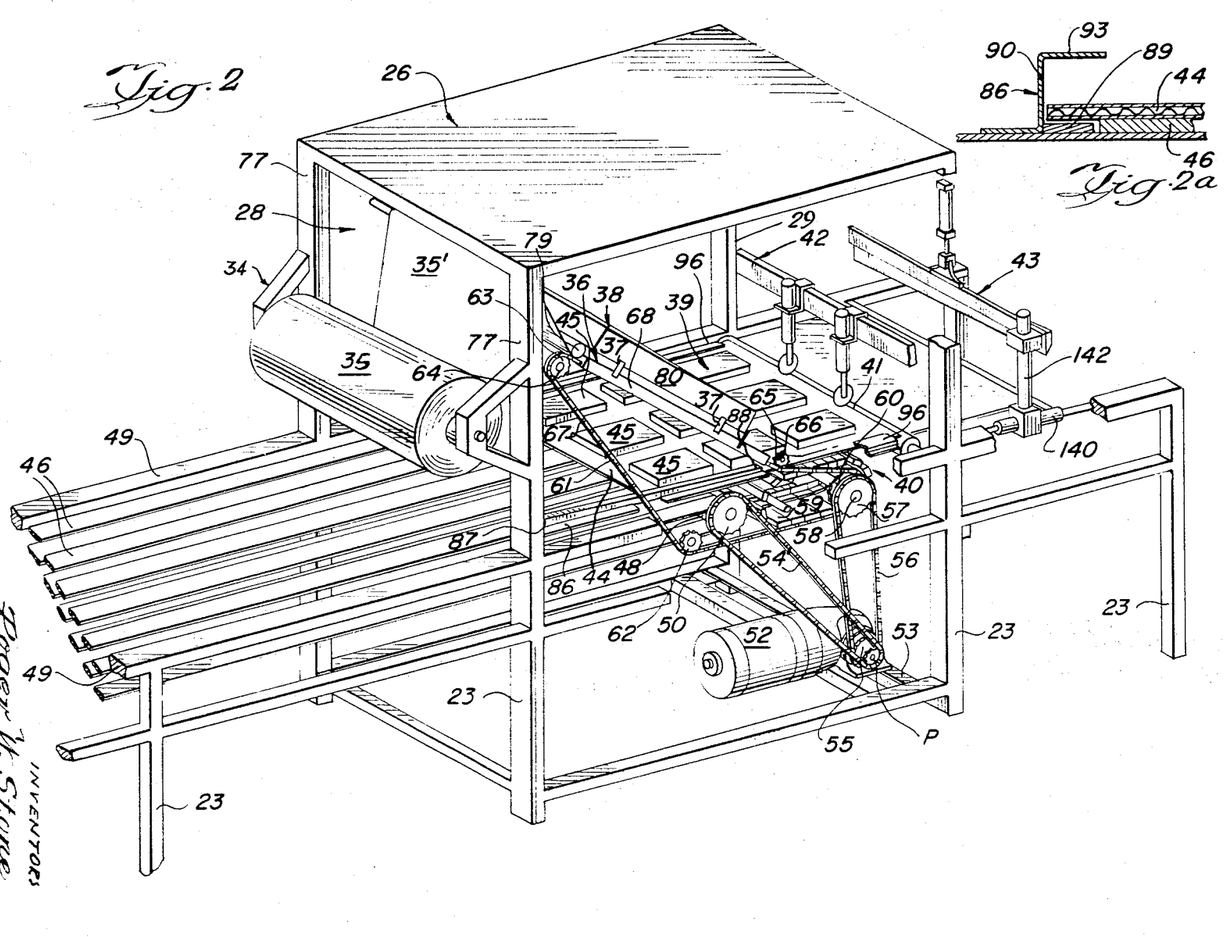
FIG. 2 is a fragmentary perspective view of said machine with portions of the cabinet removed to show details of the machine, there likewise being portions of the machine broken away to show operating parts thereof.
FIG. 2a is a fragmentary sectional view taken through the web or substrate conveyor to show the guide means for the web or substrate.
Figure 3:
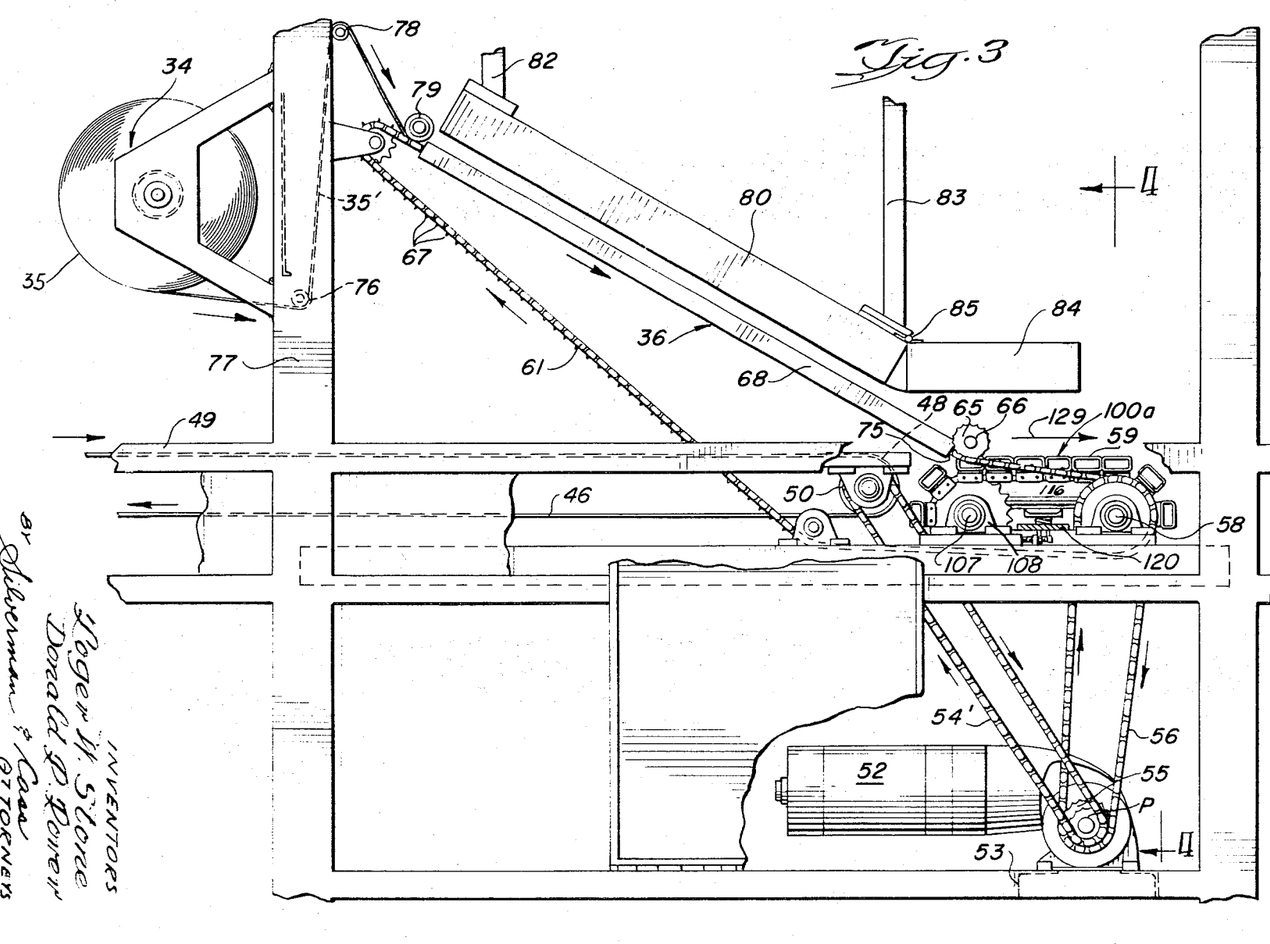
FIG. 3 is an enlarged, fragmentary side elevational view of the machine with portions of the cabinet broken away to show major operating components thereof.
Figure 4:
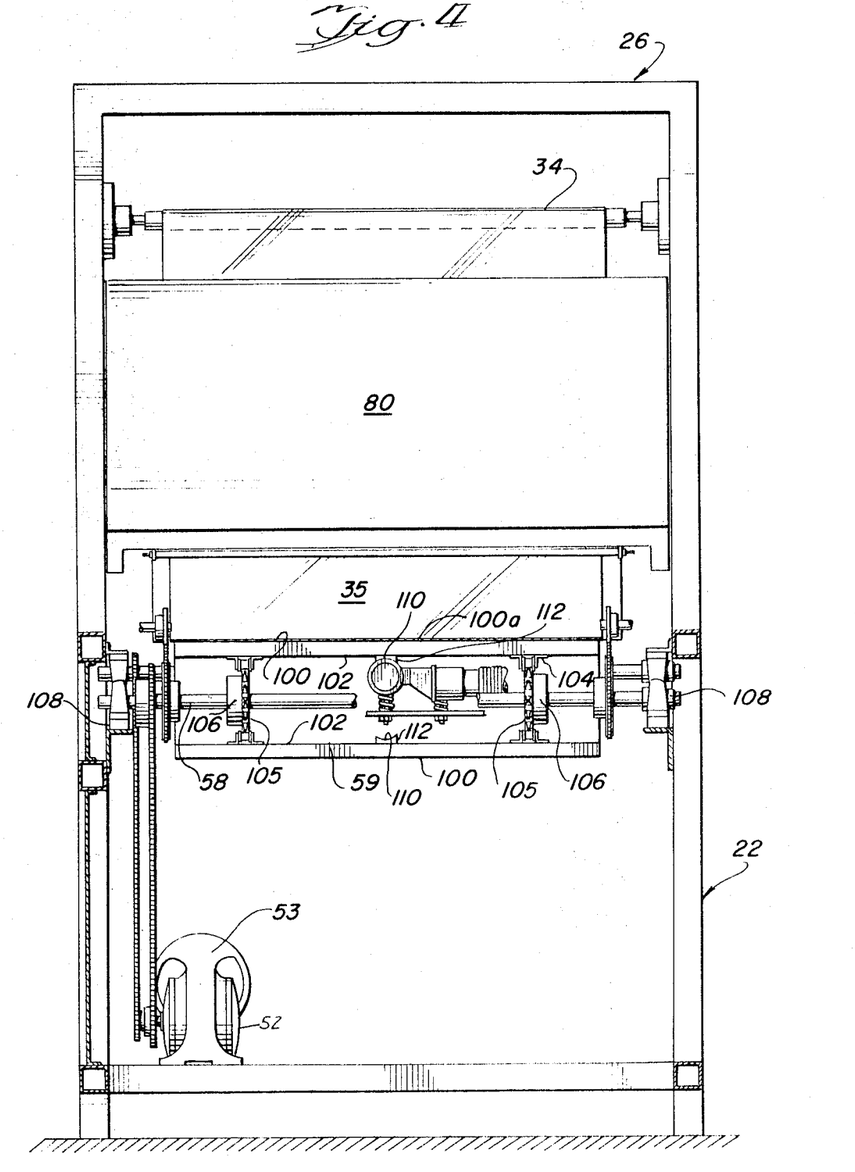
FIG. 4 is a fragmentary sectional view taken through said machine along the line 4—4 of FIG. 3 and in the general direction indicated.

As seen in FIG. 1, a reel 34 supporting a roll of thermoplastic film or sheet 35 spaced above the conveyor 27 is mounted on the cabinet 26 for continuous feeding thereof into the cabinet through said open side 28. As seen in FIG. 2, the web of film 35 is fed through said side 28 to a film-transporting means designated generally 36 for passage below a heater assembly designated generally 38. The film-transporting means 36 and heater assembly 38 are arranged in generally parallel planes which are canted or diagonal to the horizontal plane of the conveyor 27, the means 36 being suspended from the assembly 38 by brackets, such as bracket 37' as seen in FIG. 3.

Also seen in FIG. 2 is a skin package designated 39 illustrated in process of production, the package 39 being carried partially by the conveyor 27 and by the novel vacuum-forming means designated generally 40. The right-hand end portion only of the package has film 35' laminated thereon. As the package 39 is being produced, its leading edge 41 leaves the vacuum-forming station and enters the package-trimming station having package-trimming means 42 and 43 arranged to engage and slice the package 39 into individual or discrete package units. The package-trimming means 42 is designed to slice package 39 in the direction of movement of the conveyor whereas the trimming means 43 is designed to cut the package transversely across the same or normal to the linear direction of movement of the package 39 through the machine from left to right.

The operation of the machine 20 as described generally is continuous and uninterrupted. As seen in FIG. 2, the carded articles, which in package 39 would be represented by the base pad or substrate 44 and the block forms 45, would be loaded on the conveyor 27 at the entrance end 24 either manually or by automatic loading means which have not been shown since such means do not form a part of the herein invention. The substrate 44 may be individual discrete panels of air-permeable paperboard such as cardboard, corrugated board, chipboard or paper loaded with facing edges either abutting or in close proximity with one another so as to move in a continuous or substantially continuous line along the conveyor. Individual panels of plastic sheet or film also are feasible which are perforated initially to permit passage of air and then sealed across the surface opposite the one that is plastic laminated. In this manner, nonporous board also can be used. It is contemplated that the substrate also can be unwound from a roll of corrugated or other suitable paperboard material and fed along the conveyor 27 as a continuous web. The articles 45 could be loaded on the substrates or web either manually or by automatic loading apparatus, depending upon the nature of the article desired to be skin packaged. With the machine 20 operating, packages 39 will be formed in the cabinet 26 automatically and continuously and discharged from the exit end 29 of the cabinet without interrupting operation of the machine, as would be the case in the cyclic operation of the skin-packaging machine of my U.S. Pat. No. 3,377,770.

A detailed description of operating components of the machine 20 follows in a sequence which is not intended to be construed as an assignment of an order of importance to said components in the overall operation of the machine. Where mechanical parts are of a well-known and conventional nature, generic terms will be assigned thereto with the intention that well-known equivalent parts may be substituted to achieve the same general function therefor.

Referring to FIGS. 1 and 2, the conveyor 27 has an upper reach and a lower reach provided by a plurality of horizontally oriented belts 46 trained around a roller 47 adjacent the entrance end 24 and a roller 48 supported in the cabinet 26 adjacent the vacuum-forming means 40. The individual belts 46 are spaced apart laterally between the longitudinally extending stringers 49 at the top end of the frame 22. A single wider conveyor belt can be substituted or a different conveyor medium is feasible since the texture or porosity or lack thereof is not critical to successful operation of the machine. The roller 47 is horizontally oriented with its ends suitably journaled in pillow blocks (not shown) supported on the frame 22. The roller 48 likewise is horizontally oriented and aligned with the roller 47. The roller 48 mounts a sprocket 50 which is driven from the endless sprocket chain 54' trained thereover.

The drive means for the conveyor is provided by a motor 52 supported on a motor mount or platform 53 on the interior of and at the bottom of cabinet 26 below the vacuum-forming means 40, as best seen in FIG. 2. Through a suitable gear reduction system (not shown), the motor 52 drives a pinion P. The chain drive 54' is trained to drive the conveyor 27 from the pinion P.

Motor 52 also drives a sprocket or pinion 55 which is engaged by the endless chain drive 56. The chain drive 56 is looped around a sprocket 57 carried on the end of a shaft 58 journaled in pillow blocks in a conventional manner between the upper stringers 49 inside the cabinet 26. Rotation of shaft 58 drives the angularly displaceable platens 59 of the vacuum-forming means, to be described in detail subsequently herein.

As seen in FIGS. 2 and 3, shaft 58 also mounts a pair of sprockets 60 over each of which is trained an endless chain drive 61 which together are incorporated into the film-transporting means 36. Each chain drive 61 is trained over a sprocket 62 journaled on the frame 22, a sprocket 63 mounted on the shaft 64 adjacent the upper end of the film-transporting means 36, and a sprocket 65 on shaft 66 adjacent the lower end of said means 36. Said chain drives 61 each have a series of intermittently spaced tines or tapered pins 67 extending outwardly therefrom for piercing through the thermoplastic film inwardly of the longitudinal edges thereof. The chain drives 61 are spaced apart a distance calculated to permit the tines or pins to pierce the film web 35' as it is pulled thereby from the roll 35 and support the web of film in its traversal below the heater assembly 38.

Figures 5, 5A:
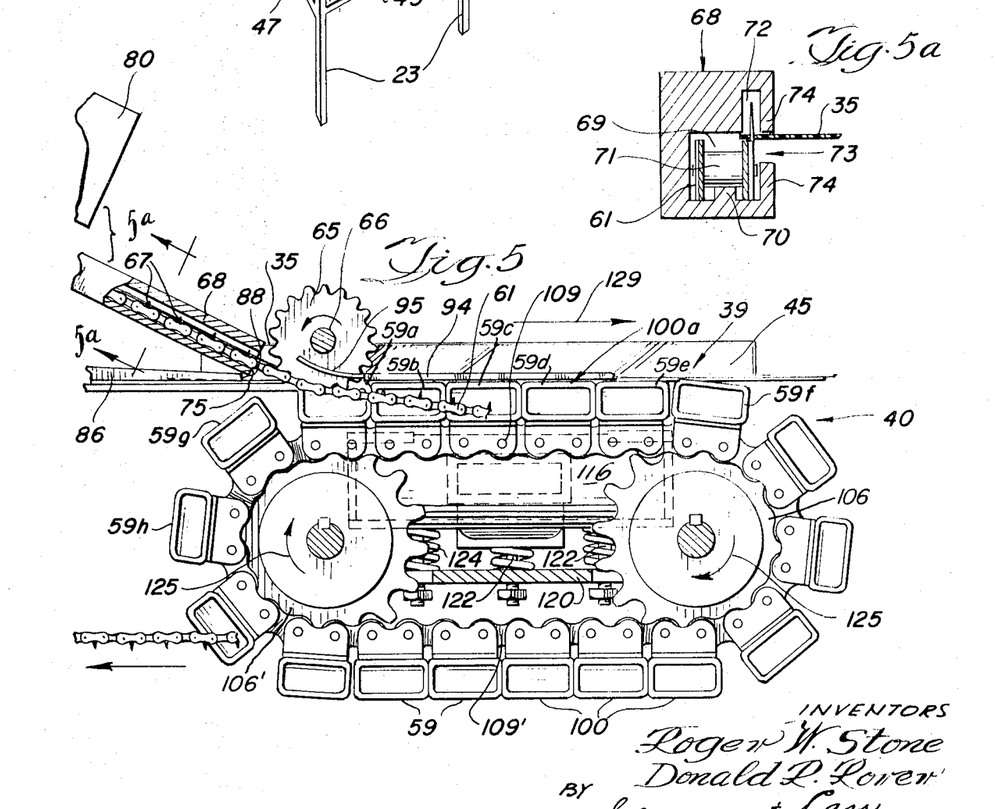
FIG. 5 is an enlarged fragmentary elevational view showing the vacuum-producing means and part of the film-transporting means of the invention, the heater hood being modified for use with lighter gauge films.
FIG. 5a is a fragmentary sectional view taken along the line 5a—5a of FIG. 5 and in the general direction indicated.

Referring to FIGS. 3, 5 and 5a, there is shown a pair of identical extruded metal guideways 68 through which the chain drives 61 move, said guideways 68 being arranged below the heater assembly 38. Each guideway 68 is of elongate, generally C-shaped configuration and of sufficient length to extend substantially between sprockets 63 and 65. Referring to FIG. 5a, the chamber 69 in the guideway has an upstanding boss 70 on the floor thereof which engages the chain links 71 of drive 61 during its movement through the guideway. The guideway also has an elongate notch 72 for accommodating the tines 67 secured on the links 71. In FIG. 5a, the web 35' of film is shown inserted in the chamber 69 through the lateral passageway 73 between the facing arms 74 of the guideway 68 and supported on the tine 67 penetrated upwardly therethrough. As seen in FIG. 5, the lower end 75 of the guideway is spaced to the left of the sprocket 65 a small distance to provide clearance for stripping the film 35' from the tines 67 before the chain drives 61 move below the level of the conveyor.

Referring to FIG. 3, the film web 35' is drawn from the roll 35 below guide rollers 76 mounted on the standards 77 of the cabinet 26 at the entrance end thereto, upwardly over a pair of guide rollers 78 and threaded below a film guide 79, at the entrance to the guideways 68. The film guide 79 serves properly to align the film web 35' with the guideways 68 and tines 67 so that the film will not bind or unwind from the reel on a bias so as to jam in the guideways and be in improper registry with the web or substrates in transport on the conveyor 27 to the vacuum-forming station 40.

The heater assembly 38 is supported in the cabinet 26 in a canted position of about 30° above and parallel with the guideways 68. The assembly 38 includes a reflective metal hood 80 of boxlike configuration opening downwardly. Mounted spanned across the open end of the hood and along the length thereof are parallel electrical heating tubes (not shown) of familiar radiant heat type. The rigid posts or supports 82 and 83 are secured at opposite ends of the hood 80 and represent one form of heater assembly position adjustment means although other adjustment means are feasible for achieving this function. The heater assembly is movable upwardly and downwardly relative to the film guides. The section 84 is hingedly connected to the forward end of the hood 80 as indicated at 85, the section 84 extending over the vacuum-forming station 40. It can be pivoted from its position overlying the vacuum bed to provide a shorter hood. This section 84 is especially suitable for use with heavier gauge film or for film having a higher melt temperature thereby giving a longer heater span under which the film must traverse. However, for lighter gauge films or films with lower melt temperatures, the shorter hood 80 seen in FIGS. 2 and 3 and lacking the section 84 would be feasible. Hence both types of heaters have been illustrated.

The heater assembly 38 is electrically operated and hence, may include temperature-sensitive signal means (not shown) for sensing the temperature of the film 35' passing below it during operation of the machine. Also, there will be a suitable switch on the control panel 33 for energizing the heater assembly when starting the machine. The temperature of the heater assembly during operation of the machine is such as to cause the temperature of the film 35' to be raised gradually to a desired forming temperature as it moves diagonally from the upper ends of the guideways 68 to the lower ends 75. Likewise, means for varying the operating temperature of the heater assembly 38 within a desired range of temperatures to permit use of different gauges and kinds of thermoplastic film can be provided using conventional temperature control circuit arrangements for this purpose. The heater also is of the type constructed to cool off promptly after it is shut off so as to avoid melting of film located below it. Also, the heater is a high-speed warmup type. Consequently, it has been deemed unnecessary to illustrate any specific temperature control circuit means for this purpose.

In order to align the substrate panels 44 or web with the film 35' for feed to the vacuum-forming station 40, I provide a pair of guideways 86 supported on the stringers 49 on opposite sides of the conveyor belts 46. The guideways 86 also are located inside of the cabinet 26, as seen in FIGS. 2, 2a and 5. In FIG. 2a, the guideway 86 is an elongated, step-shaped formation convergent from one end 87 to the other end 88. The wider dimension end 87 is located closest to the entrance end 24 and the narrower dimension end 88 reaches just to the lower end 75 of the guideways 68, as seen in FIG. 5. There is a spacer 89 between the vertical leg 90 and the conveyor belt 46, the leg 90 preventing undue lateral shifting of the substrate 44 as it moves along the belt. The distance between the upper leg 93 of the guideway 86 and the substrate 44 will decrease as the substrate moves from upstream end 87 to downstream end 88.

Referring to FIG. 5, there is a second pair of guideways 94 downstream from guideways 86 which guide the package 39 in its movement through the vacuum-forming station 40. Each guideway is a shaped metal member similar to guideway 86 for suitably guiding the package 39. The entrance end 95 of each guideway is turned upwardly to provide clearance for the film, being stripped from the film-transporting chain drives 61. However, the guideways 94 are of uniform height from end-to-end thereof, the downstream end 96 extending past the vacuum-forming station 40.

VACUUM-FORMING MEANS

The vacuum-forming means 40 is comprised of a plurality of identical hollow, boxlike platens 59 each having an upper, perforated flat surface 100 and bottom surface 102. The opposite ends of each platen are closed by imperforate caps 103. Secured to the bottom surface 102 of each platen is a pair of spaced-apart bifurcated brackets 104 for mounting the platen on a pair of endless chain drives 105 in a conventional manner. The chain drives 105 are trained around a pair of sprockets 106 spaced apart on shaft 58, and aligned sprockets 106' fixedly mounted on the shaft 107 journaled in suitable pillow blocks such as 108, seen in FIG. 3. Thus, the platens 59 are supported on the spaced-apart chain drives 105 at a location immediately downstream or to the right of the conveyor 27 and inside cabinet 26.

A plurality of platens 59 are mounted in a ring formation along the circumference of the endless chain drives 105 in sufficient number so that they will abut along the upper and lower horizontal reaches 109 and 109' respectively of said chain drives. As seen in FIG. 5, the abutting platens 59a, 59b, 59c, and 59e on the upper reach 109 together have their upper perforated surfaces 100 flush to provide a platform or table surface 100a on the same level or flush with the conveyor 27.

Intermediate the bifurcated brackets 104, each platen has an elongate, median slot 110 which extends perpendicular to the end caps 103. Each slot or passage 110 has its longitudinal side edges coinciding with the inside surfaces of a neck of throat formation 112 brazed or otherwise secured to the bottom wall 102 of the platen. Each neck 112 has an internal shoulder 113 intermediate its ends, so that the open end 114 thereof is larger than slot 110. The end face 115 of each neck 112 is arcuate and of the same radius of curvature as the circumference of manifold 116, seen in FIGS. 6 and 8. There is thus provided an elongate port 114 communicating with the internal chamber of the platen.

The manifold 116 or vacuum box is a cylindrical member operatively connected to an exhaust pump 118 for drawing a vacuum through the manifold 116. The manifold 116 and pump 118 are supported on a platform 120 under upwardly directed spring bias as represented by the bolts 122 extending through platform 120 and carrying coil springs 124 on the shanks thereof engaging against the manifold and pump respectively.

Figure 6:
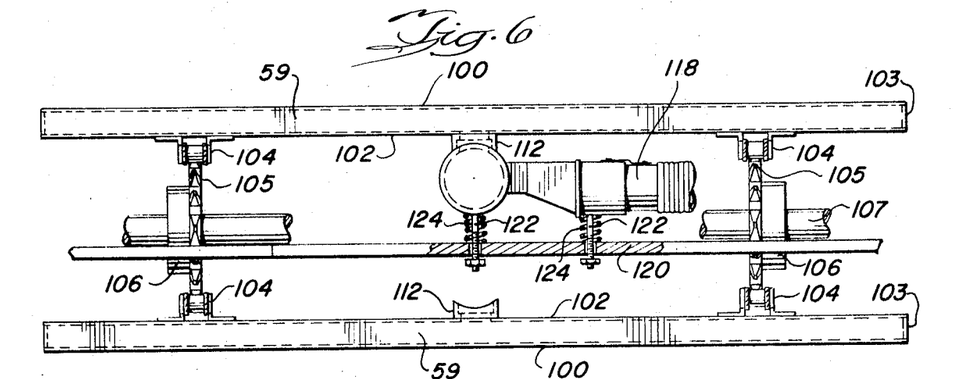
FIG. 6 is a fragmentary elevational view showing details of the vacuum-producing means of the machine.
Figure 7:
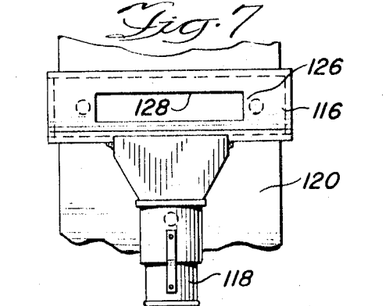
FIG. 7 is a fragmentary top plan view showing the manifold of the vacuum-producing means of the invention.
Figure 8:
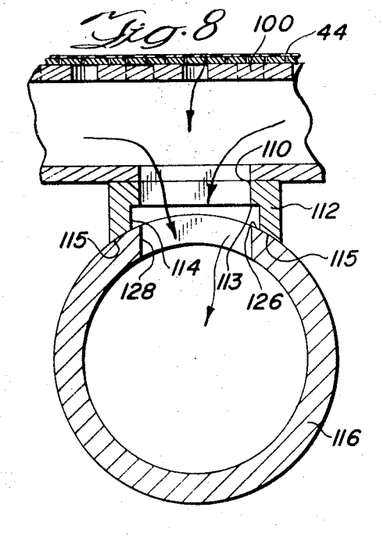
FIG. 8 is a fragmentary vertical sectional view taken through the vacuum-producing means of the invention and transverse to the normal direction of movement of the platens.

Referring to FIGS. 6 and 8, it will be seen that the neck formations 112 on all platens 59 are aligned with the manifold 116 so that as the platens 59 are moved in a clockwise direction indicated by arrows 125 on sprockets 106, 106' along the upper reach 109, the arcuate end faces 115 engage flush with and ride upon the upper curved circumference 126 of the manifold. The manifold 116 has a slot 128 in said circumferential surface portion 126 which registers with the port 114 in the neck formation 112 on each platen, and hence, in communication with the slot 110 of the platen. As illustrated in FIG. 5, the platens 59a through 59e are riding astride the manifold 116 and each platen will have its slot 110 communicating with slot 128 in the manifold. This, with the vacuum system continuously being exhausted, through the manifold 116, all of the platens 59a through 59e will be exhausting through their ports 114 and their perforated upper surfaces 100. Since the upper perforated surfaces 100 of these abutting platens moving along upper reach 109 are in registry at 100a, there is formed thereby a flat vacuum bed for the machine 20. Obviously, as platen 59f leaves the upper reach 109 in the clockwise movement of the platens 59, the platen 59g will move astride the manifold. As seen in FIG. 5, platen 59g is next in line to move astride the manifold. Thus, a flat, uniform vacuum bed is constantly provided at 100a which also is moving in the direction of arrow 129 from left to right, the same direction of movement as conveyor 27. Notably, the upper reach of conveyor 27 and the linearly moving vacuum bed at 100a are on the same level or flush one with the other with the vacuum-forming means 40 being in line with and downstream of the conveyor 27. Also, in position astride the manifold 116, each neck 112 function also as a bearing for the platen which will be moving on the stationary manifold.

Figure 9:
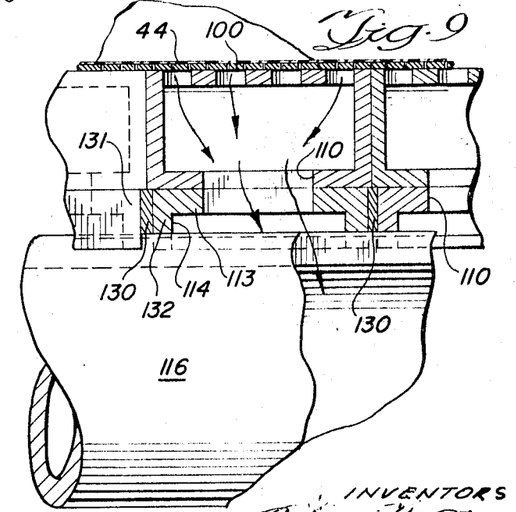
FIG. 9 is a fragmentary vertical sectional view taken through the vacuum-producing means of the invention and parallel to the normal direction of movement of the platens.
Figure 10:
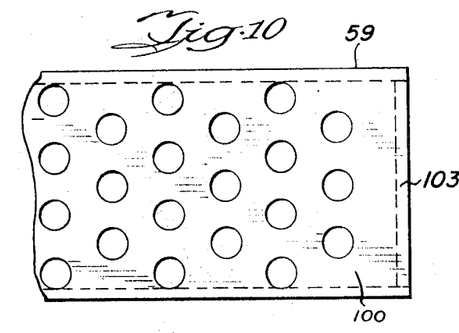
FIG. 10 is a fragmentary plan view of the perforated top wall of a platen employed in the machine of the invention.

Referring to FIG. 9, the depending neck formations 112 of abutting platens are gasketed or packed, as indicated at 130, in their passage over the manifold so as to prevent air leakage between adjacent formations 112 in riding over manifold 116 during the exhausting operation. Such gasketing can be attached to one wall 131 of a neck formation on a platen to engage against the adjacent wall 132 of a neck formation 112 on the next adjacent platen in the ride across the manifold 116. Thus, each platen 59 will have a gasket or seal member 130 on a wall of its neck formation 112 to engage the facing wall of a formation 112 on the neighbor platen.

It will be noted in FIG. 6 that the platform 120 supports the pump 118 and the manifold 116 between the platens on the upper and lower reaches of chain drives 105. The upwardly biased mounting for the manifold 116 and pump 118, as described, assures that the manifold 116 always will be urged into airtight engagement with the arcuate end face 115 of the neck formation 112 on the underside of each platen. Thus, proper and adequate airtight engagement between platens 59 and manifold 116 is assured even after minor wear of the end faces 115 or curved surface 126 of manifold 116 even after long use or minor tolerance variations in manufacture of these components.

A modified form of vacuum-producing means has been illustrated in FIGS. 11 through 15. Where parts thereof similar or identical to parts employed in the corresponding structure of FIGS. 6 through 10 have been used, the same reference characters have been used. Where functionally similar parts are employed, albeit, of modified construction, the same reference characters primed have been employed.

Figure 14:
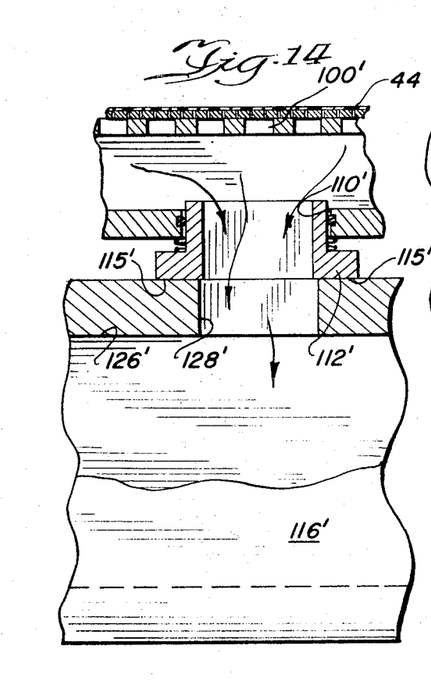
FIG. 14 is a fragmentary vertical sectional view taken through the modified vacuum-forming means and similar to the view of FIG. 8.
Figure 15:
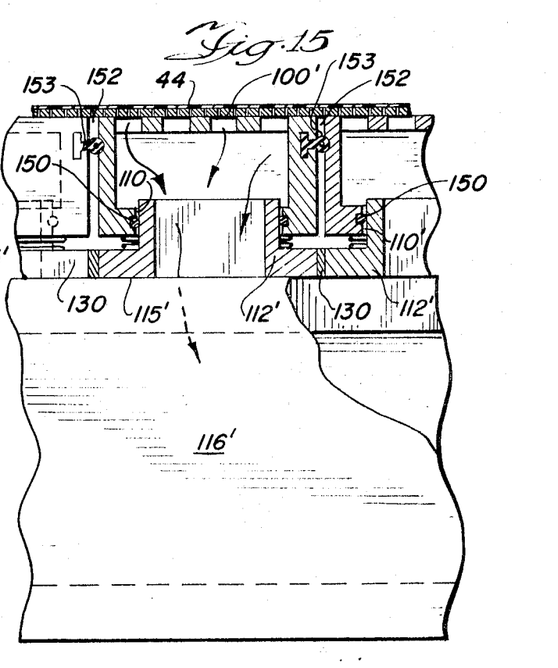
FIG. 15 is a fragmentary vertical sectional view taken through the modified vacuum-forming means and similar to the view of FIG. 9.

The modified vacuum-producing means has been designated generally 40'. The platens 59' are of boxlike formation, provided with depending brackets 104 so that each can be engaged with a drive chain 105 trained around a sprocket 106' carried on a shaft 107 and its mate on shaft 58 as in the embodiment 40. The platen 59' is longer than the member 59. However, each platen 59' has a pair of throats or ducts 112' communicating with the interior of the platen, these being spaced apart on the so-called bottom surface 102' opposite the upper perforated surface 100'. Referring to FIGS. 14 and 15, it will be seen that each neck formation is spring mounted in the slot 110', as diagrammatically shown, and sealed by means of an O-ring 150 in the slot 110' in which the same is mounted. The O-ring 150 permits limited axial movement of the formation 112' in the slot 110'. This arrangement achieves the same function as spring mounting of manifold 116 when the platens 59' traverse the platen 116'.

Again in FIG. 14, it should be noted that adjacent platens 59' do not abut on the manifold 116' but rather are slightly spaced apart as indicated by space 152. A seal or gasket 153 secured on one platen to engage the adjacent platen is provided to assure against loss of vacuum during vacuum forming of the film.

Figure 11:
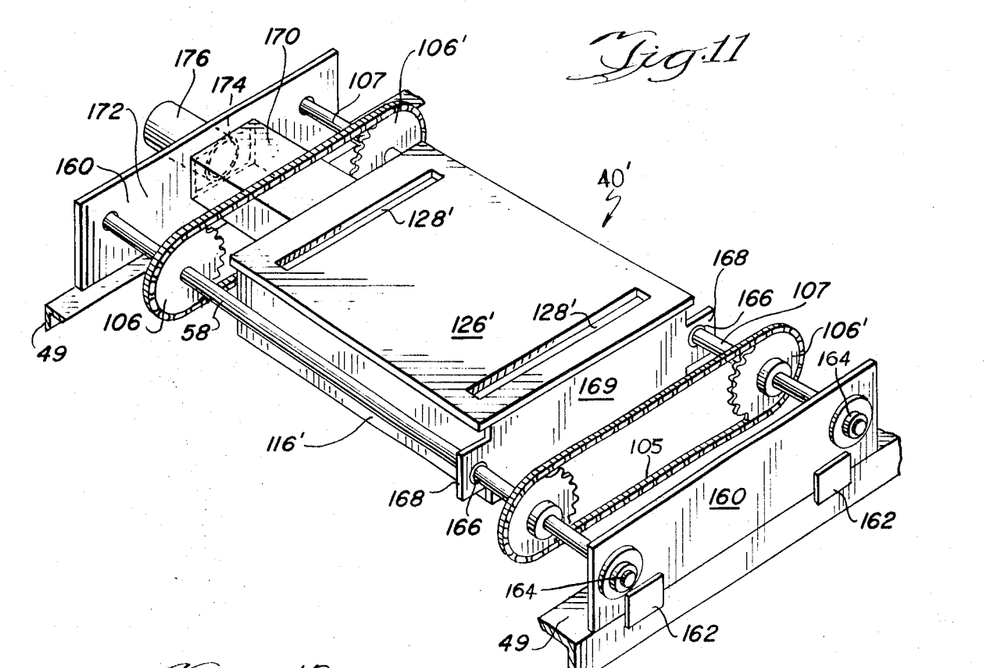
FIG. 11 is a fragmentary elevational view showing a modified form of vacuum-producing means embodying the invention capable of drawing greater vacuums at higher speeds of package production.

The major change in the means 40' resides in the manifold 116'. Manifold 116' is a large box of rectangular configuration so that its top surface 126' is flat or planar and not arcuate as in the case of manifold 116. Manifold 116' has a pair of elongate, parallel slots 128', as seen in FIG. 11, spaced apart a selected distance to correspond with the spacing between formations 112' on a platen. Since surface 126' is flat, the end face 115' of each neck formation 112' likewise is flat, as seen in FIGS. 14 and 15, so that a face 115' can slide easily on the preferably polished and hardened flat wall 126' in communication and registry with a slot 128'. Spring mounting of the necks or bearings 112' assures proper face-to-face contact of the platens and manifold 116'.

The depending neck formations 112' of adjacent platens 59' are gasketed or packed, as indicated at 130. The gasket 130 can be mounted as described in connection with platen 59.

Figure 12:
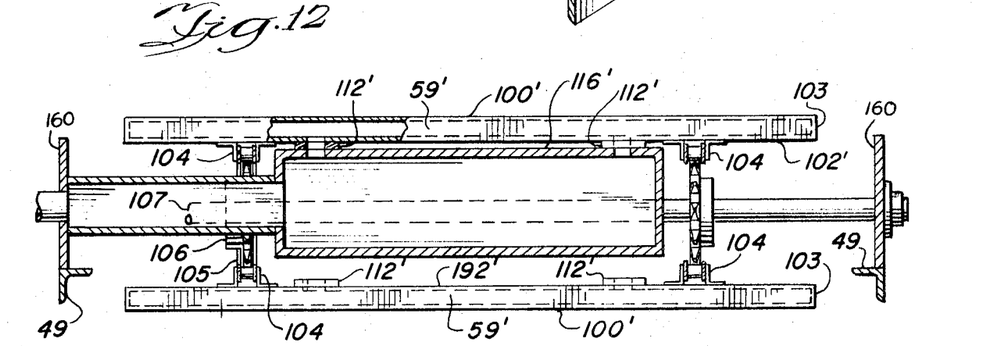
FIG. 12 is a fragmentary isometric view of said modified form of vacuum-producing means.

Referring to FIGS. 11 and 12, the manifold or vacuum box 116' is rectangular in configuration so as to provide a flat upper surface 126' having the access slots 128' as previously discussed. The manifold 116' is supported between a pair of sideplates 160 which are intended to be mounted on the side rails 49 by means of tie plates 162 so that the sideplates are upstanding on the side rails. Each sideplate has a pair of spaced-apart bearing openings 164 in which are journaled the shafts 58 and 107 in a conventional manner. The shafts 58 and 107 are freely rotatable in bearings 166 provided in the outwardly extending lugs 168 at one end of the manifold 116'. The lugs 168 are provided as extensions on an end cap 169 for one end of the manifold 116'. The opposite end of the manifold 116' has a horizontally extending extension 170 of rectangular cross section, said extension being secured to the inner face 172 of the sideplate 160 adjacent thereto.

The sideplate has an opening 174 in which is engaged a conduit 176 which is intended to be connected to a source of vacuum such as a pump, either mounted in the machine or exterior thereof. Thus, the conduit 176 connected with the extension 170 provides a vacuum inlet to the manifold 116'.

Figure 13:
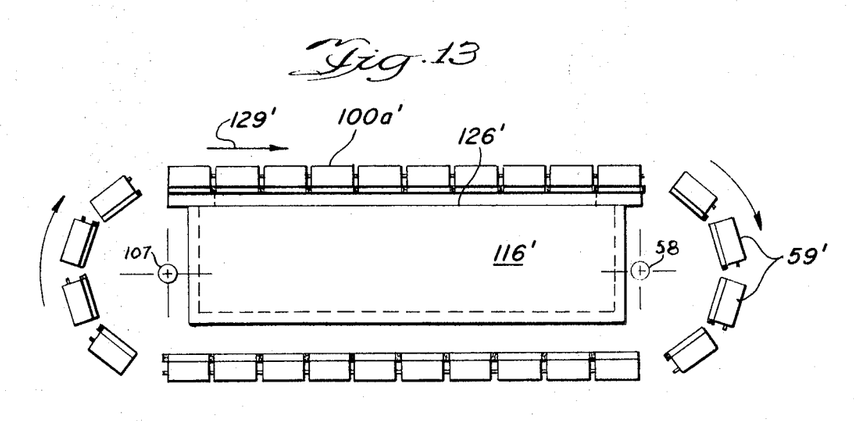
FIG. 13 is a diagrammatical view illustrating the rotary platen arrangement traversing the manifold or vacuum box.

Referring to FIG. 13, it will be seen that the platens 59' are arranged to provide a series of platens which pass in a straight line over the top surface 126' of the manifold 116' overlying the slots 128'. The series of platens so passing over the top surface 126' cooperate to provide a flat planar surface 100a' in the same manner as discussed for the vacuum system 40. It is deemed unnecessary to further describe the resulting straight line movement of a portion of the modified rotary platen system over the manifold for transporting the substrate in the direction of the arrow 129', since this operation is the same as previously discussed in connection with the system 40.

As will be appreciated, all of the chain drives are powered from the same motor 52. Through suitable gear reduction of conventional construction, it is possible to synchronize the speed of the conveyor 27, the film-transporting chain drives 61 and the angularly displaceable platens 59 for continuous, smooth operation of the machine 20. It also is possible to adjust this speed of operation over a wide range of values. Once the operation of the machine is initiated with the thermoplastic film 35' and the substrate material 44 moving through the machine, the packages 39 will be formed automatically as hereinafter described.

SEQUENCE OF OPERATION OF MACHINE 20

The sequence of operation of machine 20 is commenced with turning on the master switch (not shown) on the control panel 33. It may be desired to provide a visual indicator, such as a lamp, to indicate that power to the machine is available and a voltage meter dial to indicate when proper voltage is available. The control panel also may have a visual indicator, such as a pilot light, to show that electrical energy is available to the heater hood 80 to raise the temperature thereof. When the temperature of the heater hood is elevated to the desired temperature, a control signal can be generated by suitable means, such as a thermistor, to energize the electrical motor 52. This is the only motor in the machine 20 and preferably is a variable speed motor. The signal to the motor also energizes or starts the vacuum pump 118.

Corrugated or boxboard substrates in panel form or a continuous web of substrate are fed onto the conveyor 27 at the entrance or infeed end 24 for movement along the conveyor in a direction toward the cabinet 26. A lead portion of film 35' is withdrawn from the roll 35 and trained around the rollers 76, 78 and at film guide roller 79, impinged upon the tines 67 of the chain drive 61. At the film guide roller 79, the tines will be facing upwardly so that the film can be drawn down upon the tines. Thus, film is started into the film transport means and is moved down the inclined plane provided by the guideways 68 in a continuous movement under the heater hood 80. When the lead edge 41 of a substrate panel or the web reaches the forward end 75 of the guideways 68 or adjacent the sprockets 65, there will be available a lead edge portion from the film 35' substantially perfectly aligned with the substrate or web material which is guided in the guideways 86 on the conveyor 27. The film 35' will have been heated to a forming temperature so that it is prepared to be laid down manually on the substrate which will move from the conveyor 27 onto the surface 100a of platens 59 which are moving in a line on the upper reach of chain drives 105 in the direction of arrow 129, FIG. 3. When it is determined that the film and substrate is being properly laminated, that is, the film has been heated to a proper forming temperature and a proper vacuum is being drawn at the vacuum-forming station 40, articles such as indicated by the blocks 45 are placed on the substrate material being introduced at end 24 of the machine 20, and packaging will continue automatically thereafter.

After the packages 39 are formed at the vacuum-forming station 40, they will be discharged from the platen in the forward direction of the arrow 129 to pass to a package-trimming station represented by the package-trimming means 42 and 43, respectively. The package-trimming means 42 comprises a lineal slitting mechanism which cuts the packages 39 in the same direction of movement as the arrow 129. The package-trimming means 43 is represented generally as a powered guillotine-type shear or slitting mechanism which shears the substrate transversely of the direction of movement 129.

The operation of the package-trimming means 43 can be triggered by the leading edge 41 of a package 39 which can intercept a micro or limit switch (not shown) to a suitable power source for driving the slitting mechanism 43 first along the ways represented at 140 in a horizontal direction and along the ways represented at 142 in a vertical direction for cutting the package substrates transversely. It is contemplated that other package-trimming means can be employed with the basic machine and hence, it has been deemed unnecessary to disclose a complete package-trimming mechanism for purposes of understanding this invention. The important concept is the availability of a station position in line with the vacuum-forming station 40 and cooperable therewith to augment the continuous operational system for skin packaging which is engendered by machine 20.

Many important advantages derive from the arrangement of structural components heretofore described. In connection with the angularly displaceable platen assembly which passes over a vacuum source which is continuously drawing, the need for a package substrate, feeding mechanism normal to the platen assembly is eliminated. Since the conveyor 27 terminates short of the vacuum-forming station, the need for a specific perforated or air-permeable belt overlying a vacuum bed and drive mechanism therefor is eliminated. It will be appreciated that after vacuum forming of the package, the package is discharged directly to the package-trimming station. Also, a continuous web of substrate material can be used with this machine, this web capable of being fed in a continuous manner because of the aligned arrangement of the rotary platen system, the substrate conveyor system and the film-transporting means. This is an in-line system operable through a constant-speed motor which eliminates any criticality in the weave of the conveyor belting used. Also, the movable vacuum platens 59 serve as a transport means for the carded articles discharged from the conveyor 27. The guideways 68, 86, and 94 cooperate to assure proper registry or alignment of the film and substrate at all times so that the machine 20 is truly an automatic continuously operating machine.

Provisions for variations and adjustments in the temperature of the heater hood 80 and the amount of vacuum drawn by the manifold 116 are contemplated. Operating circuits for achieving such adjustments have not been illustrated or described in detail because they can vary within substantial limits. The temperature of the heater hood can be varied in relation to the speed of the moving web of thermoplastic film material 35' through suitable controls provided in the panel 33. These have not been shown.

It is believed that the invention has been sufficiently described to enable the skilled artisan to understand and practice the same. Minor variations in the various parts thereof are contemplated without departing from the spirit or circumventing the scope of the invention as set forth in the claims hereto appended.

What is desired to secure by Letters Patent of the United States is:

We claim:

1. A packaging machine for producing skin packages in a continuous sequence of operation comprising:
   a. a linearly movable conveyor for transporting package substrate material carrying articles thereon in a direction toward a vacuum-forming station;
      said conveyor having an entrance end and an exit end,
   b. a vacuum-forming station including vacuum-producing means in line with said conveyor and spaced from said exit end;
      said vacuum-forming station having a linearly movable vacuum bed substantially flush with the level of said conveyor and in parallel registry with the direction of movement of the conveyor,
   c. a thermoplastic film-transporting means supported above the conveyor at an acute angle relative to the plane of said conveyor;
      said film-transporting means having a film infeed end and a film discharge end, said film discharge end being closer to the conveyor than said infeed end and in close proximity to the exit end of the conveyor, d. a heater assembly supported above the film-transporting means for elevating the temperature of film traversing below the heater assembly to its vacuum-forming temperature;

e. means for feeding a continuous web of said film into the infeed end of said film-transporting means;

f. said conveyor constructed and arranged to discharge said package substrate material to said vacuum bed synchronized with the discharge of heated film from the discharge end of said film-transporting means;

g. said vacuum bed being under a vacuum-drawing condition to continuously draw the heated film down over the articles and adhere same to the substrate material as said substrate material is moved linearly on said vacuum bed.

2. A packaging machine as described in claim 1 which includes a plurality of angularly displaceable vacuum platens cooperating to provide said vacuum bed during a portion of the displacement movements.

3. A packaging machine as described in claim 1 which includes a rotary platen system having a plurality of vacuum platens cooperating to provide said vacuum bed during a portion of the cycle of revolution of said system.

4. A packaging machine as described in claim 1 in which said conveyor, vacuum bed and film-transporting means have drive means cooperating to move the said conveyor, vacuum bed and film-transporting means at speeds synchronized to effect said continuous sequence of operation of the machine.

5. A packaging machine as described in claim 1 in which said film-transporting means includes a pair of endless drive members having protruding tines for supporting and moving the film impinged thereon.

6. A packaging machine as described in claim 5 in which said film-transporting means includes elongated rigid guideways supported below the heater assembly, each guideway having the film and a drive member movable therethrough during the period of time the temperature of the film is being elevated.

7. A packaging machine as described in claim 1 in which there is a guide means on opposite sides of the conveyor for guiding movement of the substrate material toward said exit end of the conveyor, said film-transporting means including a pair of guideways for supporting opposite longitudinal edges of the film in its traversal below the heater assembly and guiding said film toward said exit end in registry with said substrate material for conjoint movement on said vacuum bed.

8. A packaging machine as described in claim 1 in which a package-trimming station is located in line with said vacuum-forming station for receiving completed packages from said vacuum-forming station.

9. A packaging machine as described in claim 2 in which a package-trimming station is located in line with said vacuum bed for receiving completed packages from said vacuum-forming station.

10. A packaging machine as described in claim 3 in which a package-trimming station is located in line with said vacuum-forming station for receiving completed packages from said vacuum-forming station.

11. A skin-packaging machine as described in claim 1 in which said vacuum-forming station includes an exhaust pump and a manifold coupled with said vacuum bed, said vacuum bed including a plurality of angularly displaceable vacuum platens sequentially coupled with said manifold to provide a constantly drawing vacuum bed for continuous production of skin packages.

12. A skin-packaging machine as described in claim 11 in which said platens each have an upper perforated surface cooperable with a like surface on an adjacent platen to form said vacuum bed, and a bottom surface having an open neck formation adapted to be coupled with the manifold when the subject platen is forming said vacuum bed.

13. A skin-packaging machine as described in claim 11 in which there is a pair of endless chain drive means having said platens mounted thereon in a ring formation.

14. A packaging machine as described in claim 11 in which said manifold is spring biased into coupled engagement with said platens.

15. A packaging machine as described in claim 3 in which said vacuum-producing means includes an exhaust pump and manifold coupled with said vacuum bed, said manifold being spring biased into coupled engagement with said platens.

16. A skin-packaging machine as described in claim 1 in which said vacuum-forming station includes an exhaust pump and a manifold coupled with said vacuum bed, said vacuum bed including a plurality of rotary mounted vacuum platens sequentially coupled with said manifold to provide a constantly drawing vacuum bed for continuous production of skin packages.

17. In a packaging machine for producing skin packages in a continuous sequence of operation which includes a linearly movable conveyor for transporting package substrate material carrying articles thereon in a direction toward a vacuum-forming station having an exit end and vacuum-producing means, a thermoplastic film-transporting means supported on an acute angle relative to the plane of said conveyor, said film-transporting means having a film infeed end and a film discharge end, said film discharge end being closer to the conveyor than said infeed end and in close proximity to the exit end of the conveyor, means for feeding a continuous web of said film into the infeed end of said film-transporting means, and a heater assembly supported above the film-transporting means for elevating the temperature of film traversing below the heater assembly to its vacuum-forming temperature; the herein invention comprising a vacuum-forming station adapted to be installed in line with said conveyor and spaced from said exit end, said vacuum station having an angularly movable platen assembly adapted to provide a linearly movable vacuum bed for receiving substrate material from said exit end of the conveyor and heated film from the discharge end of said transport means for continuously forming packages as said substrate material and film are moved linearly by said vacuum bed, said platen assembly adapted to be operatively coupled to said vacuum-producing means.

18. In a packaging machine as described in claim 17 wherein said platen assembly includes a plurality of rotary-mounted platens movable at a speed synchronized with the speed of movement of said conveyor and film-transporting means.

19. In a packaging machine as described in claim 18 in which each platen has a perforated upper wall and a bottom wall having an open neck formation communicating with the interior of the platen, and a cylindrical manifold having an opening in the upper circumferential surface thereof, said platens arranged to move astride said manifold with its neck formation coupled to the opening in said manifold for exhausting through the perforated upper wall of the platen.

20. In a packaging machine as described in claim 17 wherein said platen assembly includes a plurality of rotary-mounted vacuum platens, a pair of endless chain drives mounting said platens thereon in a ring formation, said platens movable sequentially to provide a flat linearly movable vacuum bed flush with and in line with the level of the conveyor for receiving said substrate material from the conveyor, said vacuum bed being movable linearly in the same direction as the conveyor.

21. In a packaging machine as described in claim 17 in which there are guideways on opposite sides of said platen assembly for engaging and guiding the substrate material moving thereon.

22. In a packaging machine as described in claim 17 in which said platen assembly comprises a plurality of rotary-mounted vacuum platens, a manifold arranged to be sequentially coupled with each of said platens and with a limited number of said platens concurrently, said limited number of platens so coupled cooperating to provide a linearly movable vacuum bed located to receive the substrate material from said conveyor and move same through said station for continuously forming the skin packages.

23. In a packaging machine as described in claim 18 in which each platen has a perforated upper wall and a bottom wall having a pair of open neck formations communicating with the interior of the platen, and a manifold having a planar upper surface provided with a pair of elongated access openings therethrough, said platens arranged to move astride said manifold with its neck formations coupled to the openings in said manifold for exhausting through the perforated upper wall of the platen.

24. In a packaging machine as described in claim 23 in which said neck formations are resiliently mounted in said bottom wall.

25. In a packaging machine as described in claim 23 in which said manifold has a rectangular configuration, one end of said manifold having means for connecting said manifold to a source of vacuum.

26. A packaging machine as described in claim 11 in which said platens each have an upper perforated surface cooperable with a like surface on an adjacent platen to form said vacuum bed and a bottom surface having a pair of open neck formations adapted to be coupled with the manifold when the subject platen is forming said vacuum bed.

27. A skin-packaging machine as described in claim 26 in which each of said open neck formations is resiliently mounted on said platen.

28. A skin-packaging machine as described in claim 27 in which said manifold is rectangular and the upper surface thereof is flat.

29. A method for continuously producing skin packages in which carded articles are encased in a thin thermoplastic film material laminated to a base pad or substrate comprising the steps of:
  a. continuously conveying substrate material carrying articles in a linear direction toward a vacuum-forming station having vacuum-producing means and an in-line linearly movable vacuum bed;
  b. synchronizing the movements of the conveyor for said substrate material and said vacuum bed to cause the same to move at the same linear rate of speed;
  c. transferring the substrate material with articles from said conveyor to said vacuum bed in a continuous manner;
  d. feeding a continuous web of heated thermoplastic film to the area of transfer of the substrate material from the conveyor to said vacuum bed; and
  e. placing said vacuum bed under a vacuum-drawing condition continuously to draw the heated thermoplastic film down over the articles and to laminate said film to the substrate material being moved on said vacuum bed for continuously producing skin-packaged articles.

30. A method as described in claim 29 in which said film and substrate material are guided in their movement to said station to reach the same in registry condition one with the other.

31. A method as described in claim 29 in which said skin packages are discharged to a package-trimming station for separation into discrete packages.